Sept. 27, 1955　　　　　O. WEISS　　　　　2,718,928
SEISMIC METHOD OF GEOLOGICAL EXPLORATION
Filed March 7, 1951　　　　　　　　　　3 Sheets-Sheet 1

INVENTOR
OSCAR WEISS
BY
John Farley
ATTORNEY.

Sept. 27, 1955  O. WEISS  2,718,928
SEISMIC METHOD OF GEOLOGICAL EXPLORATION
Filed March 7, 1951  3 Sheets-Sheet 2

*INVENTOR*
OSCAR WEISS

BY

John Farley
ATTORNEY.

Sept. 27, 1955            O. WEISS            2,718,928

SEISMIC METHOD OF GEOLOGICAL EXPLORATION

Filed March 7, 1951            3 Sheets-Sheet 3

*INVENTOR*
OSCAR WEISS

BY

*John Farley*
ATTORNEY.

United States Patent Office 2,718,928
Patented Sept. 27, 1955

2,718,928

SEISMIC METHOD OF GEOLOGICAL EXPLORATION

Oscar Weiss, Johannesburg, Transvaal, Union of South Africa, assignor to Weiss Geophysical Corporation, New York, N. Y., a corporation of New York Application March 7, 1951, Serial No. 214,308

5 Claims. (Cl. 181—0.5)

This invention relates to a method of geological exploration and more particularly to a novel method of seismic prospecting for minerals and oil.

In the seismic method of prospecting, elastic waves are created in the ground by means of a source of energy, usually of the impulse type, as illustrated by an explosion of dynamite. These elastic waves travel outwards in all directions from the source center, commonly called the shot point, and are usually picked up by a plurality of detectors of suitable types at spaced points on or near the surface of the ground.

It is customary to use electromagnetic detectors that produce electromotive forces proportional to the velocity of the motion of the ground. The said electromotive forces are suitably amplified and made to deflect mirror type galvanometers. An optical system is provided to supply the necessary light beams for the galvanometers and focus these beams on a moving strip of sensitized paper for permanent recording. The resulting record contains a plurality of traces, usually equal in number to the number of detectors, timing lines, and an indication of the shot instant. These features are familiar to those skilled in the art.

It is well known that, on reaching a boundary between two media of different elastic properties, a wave train is partly reflected and partly refracted. The degree to which this process occurs is governed mainly by the angle of incidence of the wave and by the velocity of wave propagation in the two media in contact. The velocity of wave propagation in each medium is in turn determined by the elastic characteristics of that medium.

In the usual practice of seismic prospecting, the elastic waves are produced by a timed explosion on or near the surface of a stratified ground. The process of reflection and refraction already mentioned will normally take place at each strata inter-face. The different stratic interfaces will cause successive wave trains to arrive at each detector in accordance with the velocity distribution in the ground.

Experience has shown the velocity of seismic wave propagation in successive layers normally increases with the depth of the layers below the surface. This fact has made possible the techniques of reflection and refraction shooting. There exist however some buried layers for which the wave propagation velocity is lower, and sometimes considerably so, than the adjacent layers above and below. These layers will be referred to as low-velocity layers. When such a low-velocity layer occurs in the series of stratified layers, it is impossible to obtain information concerning the low-velocity layer by the usual method of refraction shooting since no refraction away from the normal can be produced on the top boundary of said layer. This fact is usually explained by reference to Snell's laws as will be shown below.

One object of this invention is to determine the position, shape and extent of low-velocity layers.

Another object is to make use of the phenomenon of internal reflection occurring within low-velocity layers in the process of geological exploration for minerals and oil.

Still another object of the present invention is the determination of the dip and strike of inclined low-velocity layers by seismic methods involving internal reflections.

In the method of the present invention a layer having a low velocity of propagation, imbedded in a medium having a higher velocity of propagation, is caused to act as a wave guide for seismic waves. By acting as a wave guide is meant that the seismic waves are propagated through the layer for considerable distances with very little attenuation, and more particularly that the seismic waves cannot readily escape from the low-velocity layer by refraction through its approximately parallel faces, but instead most of them are propagated by multiple internal reflection until they reach an edge of the layer, where they escape. As a result of this action, the waves are propagated unexpectedly long distances and carry surprisingly high energy to great distances. The wave guide effect tends to be more pronounced when seismic waves of relatively high frequency are employed. For example, seismic waves having wave lengths equal or less than the thickness of the low-velocity layer give a more pronounced wave guide effect than those of longer wave length. The wave guide effect also tends to be more pronounced, the greater the difference between the velocities of propagation of the low-velocity layer and the higher velocity layer.

In the generally used seismic methods of prospecting, the upper limit of the frequency of waves recorded and used is about 100 cycles. The use of higher frequencies has been considered impractical because of the high attenuation of such higher frequency waves in rocks. Thus it has heretofore been considered impossible to transmit to long distances waves having frequencies of the order of several hundred cycles or about 1,000 cycles. If, however, as taught by the present invention, a low-velocity medium is used as a wave guide, high frequency seismic waves may be transmitted over long distances through the low-velocity medium. If a source of vibration is placed in or near the low-velocity medium, and if it is found that high frequency waves are transmitted efficiently to a detector at a distant point, this tends to prove that the low-velocity medium is substantially continuous from the point of excitation of vibrations to the vicinity of the detector. This information is valuable in enabling one to locate, or confirm the location of, the boundaries of the low-velocity layer.

Certain embodiments of the method of the present invention for mapping low-velocity media depend upon making measurements of the relative amplitudes of the displacement of the earth at different points. One embodiment of the method of the present invention includes the steps of generating seismic waves in the ground by placing a source of seismic energy within or in the vicinity of a low-velocity medium imbedded in at least one medium of higher velocity, detecting at a plurality of points seismic waves emanating from the source, and recording the intensities of the detected waves. The points of maximum intensity, i. e., the points where the displacement of the ground is greatest, are indicative of the position of the boundaries of the low-velocity medium. In one arrangement, a record of the amplitude of the ground motion is obtained by measuring the velocity of the ground motion, generating, in response to this measurement, a voltage indicative of velocity, and then integrating this voltage with respect to time so as to generate a voltage indicative of the displacement of the ground. As a variation, instead of observing the amplitudes of displacement of the ground, observations may be made of the velocity of displacement of the ground.

Other embodiments of the method of the present invention for mapping the boundaries of a low-velocity medium imbedded in a high-velocity medium depend upon measurements of the travel time of seismic waves from a source located in or near the low-velocity medium to various points remote from the source. Measurements of the travel time, together with the known distance between the source and the points of detection, enable calculation of an average velocity of propagation of the seismic waves along the intervening path comprising a first length of low-velocity medium and a second length of high-velocity medium. From this information and from the known velocities of propagation of the high and low-velocity media it is possible to calculate the lateral extent of the low-velocity medium between the point of excitation and points of detection. In practicing this method it is important to know whether the waves being measured are propagating mainly by total internal reflection from the source to the boundary of the low-velocity layer. To obtain this information, and for other purposes, the frequency of the waves may be varied either by producing frequency excitations of varying frequency with the aid of piezoelectric, magnetostriction, or electrodynamic type oscillators, or by selecting different frequency bands from explosions by means of a suitable variable filter. The average propagation velocity can then be plotted as a function of frequency or wave length. As long as the wave lengths are of higher order than the thickness of the low-velocity medium, the average propagation velocity observed will be approximately that of the high-velocity medium. When the wave lengths are changed so that they are shorter than the thickness of the low-velocity medium, then suddenly low propagation velocities will be observed for most of the detected energy if the low-velocity medium continues to a considerable extent between the point of excitation and points of detection. These observed low propagation velocities indicate that most of the waves being measured are being propagated by multiple total internal reflections through the low-velocity medium, that is, that the medium is acting as a wave guide.

These and other features, objects, and variations will become apparent as the invention is further disclosed and with reference to the accompanying drawings.

In Figs. 1–4 which are sectional views, the sectional planes are perpendicular to the boundaries between the media.

Fig. 3 is a diagram showing some of the possible wave paths when a source of energy is placed in a low-velocity layer.

Fig. 4 illustrates the possibility of long distance propagation within a low-velocity layer.

Figure 5A:
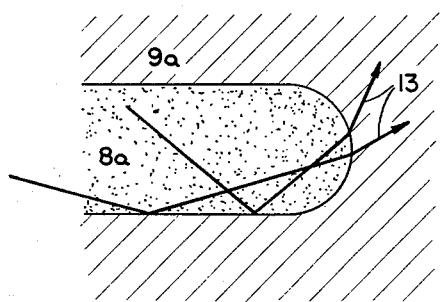
Figure 5B:
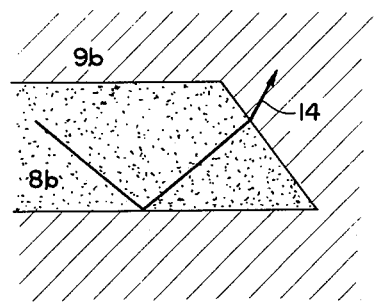
Figure 5C:
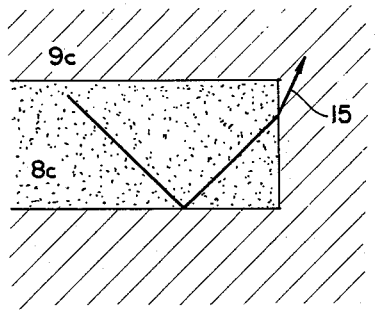
Figure 5D:
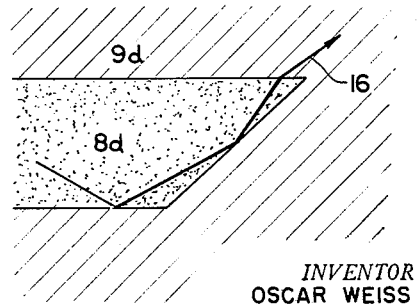

The emergence of rays from the end of a horizontal low-velocity layer is illustrated in Figs. 5a, b, c and d, which are views in vertical sectional plane of layers having differently shaped terminations or edges.

Figure 6:
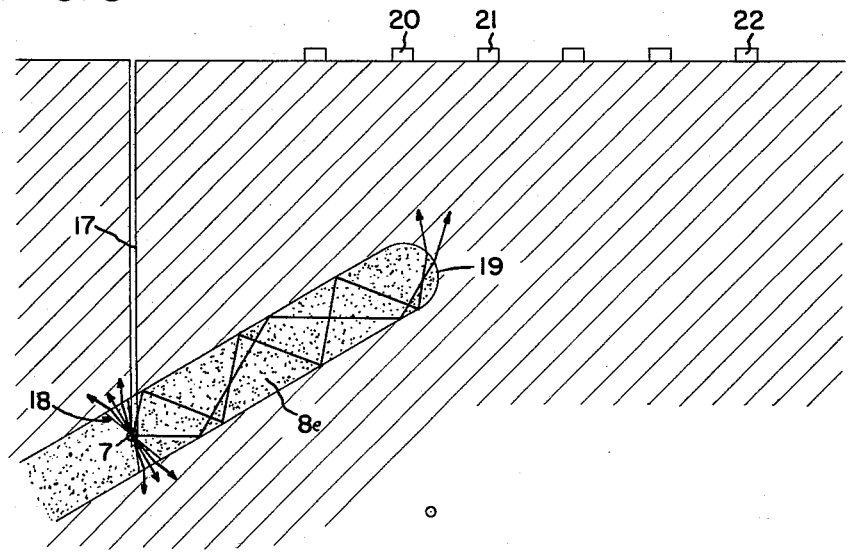

Fig. 6 shows how the invention is practiced for the purpose of determining the apex and the dip of inclined low-velocity layers. This figure is a sectional view, taken in a vertical plane.

Figure 7:
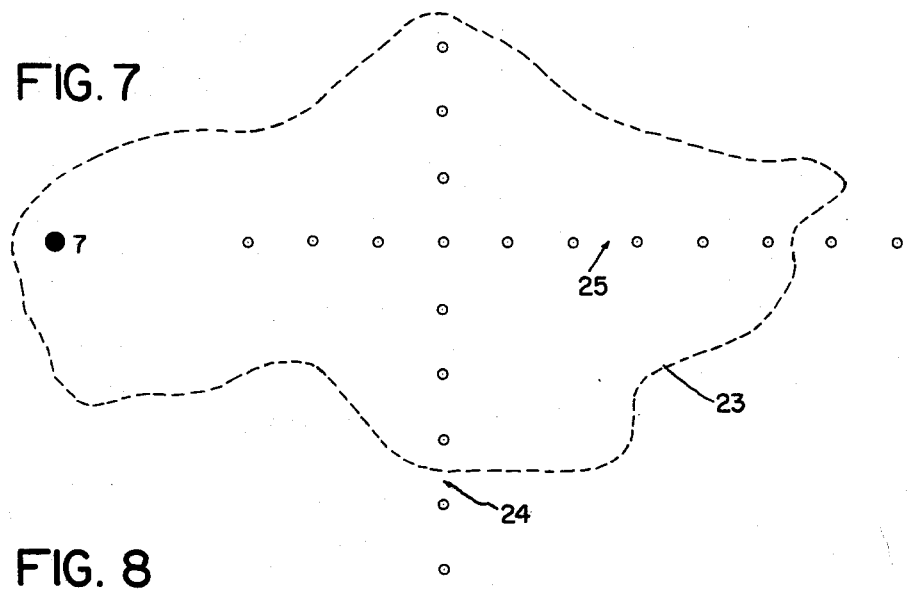

Fig. 7 illustrates one possible method of determining the extent of a low-velocity layer. This is a plan view from above the ground, showing a buried low-velocity layer in broken lines.

Figure 8:
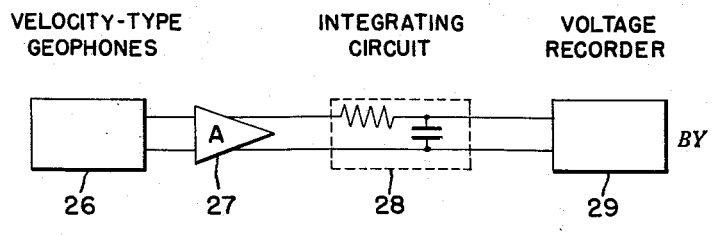

Fig. 8 illustrates pick-up apparatus which may be employed.

Figure 1:
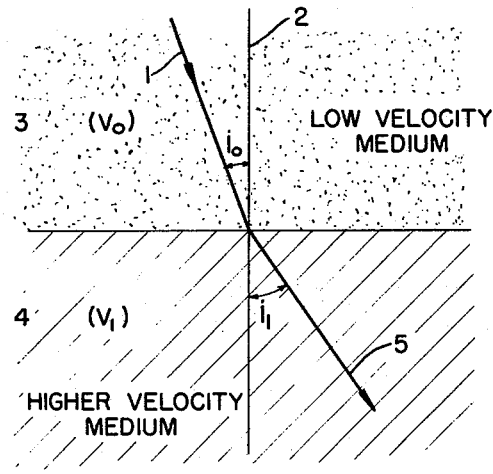
Fig. 1 illustrates the refraction of rays at a boundary between two media of different velocities.

Referring to the drawings, Fig. 1 illustrates the deviation of the incident ray 1, away from the normal 2 to the interface, when it passes from one medium 3, of velocity $V_0$ into a medium 4, of higher velocity $V_1$. The position of the refracted ray 5, is given by Snell's law $$\frac{\sin i_0}{\sin i_1} = \frac{V_0}{V_1}$$

where $i_0$ is the angle between the incident ray and the normal, while $i_1$ is the angle between the refracted ray and the normal.

Figure 2:
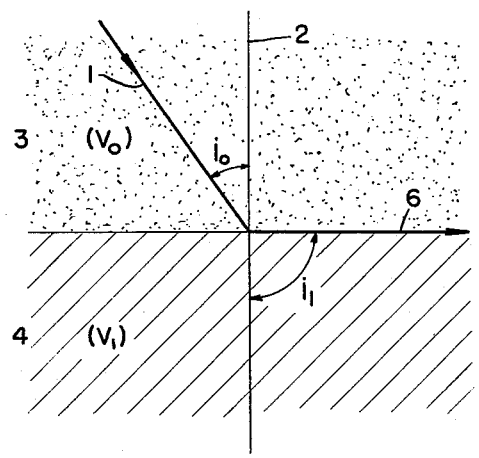
Fig. 2 illustrates the phenomenon of grazing incidence, between the same two media.

When the angle $i_0$ increases, so does the angle $i_1$ until a limit is reached, as shown in Fig. 2, where the ray no longer penetrates into the higher velocity medium 4. This limiting value of the angle of incidence is called the angle of grazing incidence. For larger angles of incidence refraction is impossible and we have total reflection into the low-velocity medium.

Figure 3:
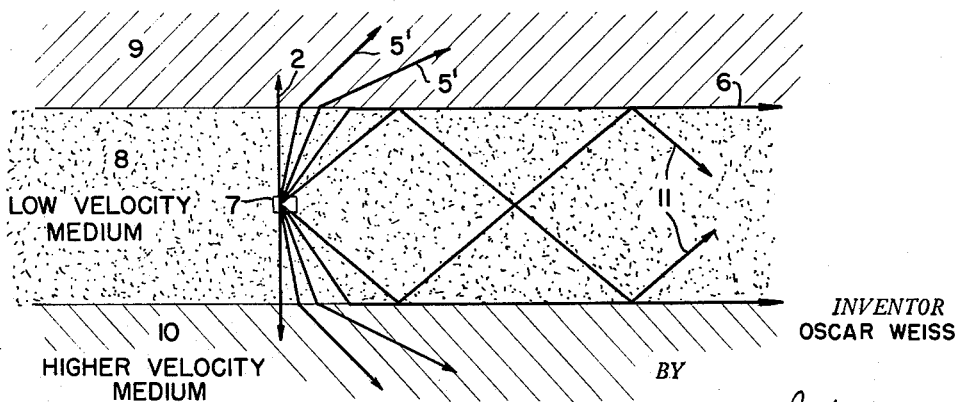

When a source of seismic waves as shown at 7 in Fig. 3 is placed within a low-velocity layer 8, adjacent to two high-velocity layers 9 and 10, the rays that can be refracted from the low-velocity layer into the adjacent layers form a cone with apex at the source. All rays emitted outside this cone, for example, the rays 11, will be reflected back into the layer 8. The present invention is based upon the phenomenon of total internal reflection of high frequency seismic waves as described herein.

It will be understood that the expression "seismic waves" as used in the present description and in the appended claims is intended to include not only waves produced by explosions, but elastic waves produced by other suitable means, for example, by vibrators or exciters of the piezoelectric, magnetostriction, electrodynamic, or mechanical type. The source 7 in the drawings and throughout the present description will be understood to represent either an explosion or any of the other type of sources of seismic waves mentioned above.

Figure 4:
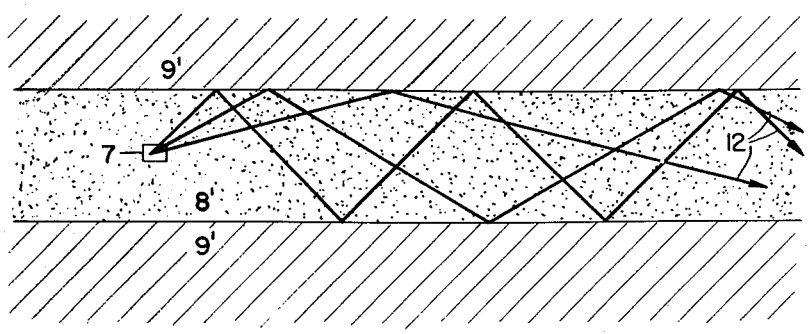

Assuming, as is shown in Fig. 4, that a low-velocity layer 8, with parallel plane boundaries, is imbedded in a medium of higher velocity 9, a ray emanating from a source 7 within the low-velocity layer, if it is reflected once on the boundaries, will be reflected again each time it reaches either of the parallel boundaries, as is illustrated by the rays 12. It will thus be impossible for this ray to be refracted into the high-velocity layer by crossing the parallel boundaries. It has been found in practice that waves can be made to travel for considerable distances on account of the phenomenon of internal reflection within low-velocity layers.

In Fig. 5a, b, c and d, are illustrated various ways in which an imbedded low-velocity layer 8a, b, c, or d, may come to an abrupt end. In all cases, it is shown that there exists a pencil of rays, illustrated in the respective figures as 13, 14, 15 and 16, which fall upon the end surfaces with such angles of incidence that they will be refracted into the higher velocity medium 9a, b, c, or d, in an upward direction. Geophones located at suitable points on the surface of the ground can detect the emerging waves from such a buried low-velocity layer.

In one preferred embodiment of the present invention, a timed explosion is produced in the low-velocity layer to be outlined. Assuming that the layer is bounded by two approximately parallel planes, it follows from the above description that a small fraction of the energy will be refracted into the surrounding higher velocity medium. If we assume a velocity ratio $V_0:V_1$ of 1:4, then it can be shown that approximately 6% of the total energy will be refracted near the source and only half of this or 3% will be refracted upwards. The remainder, or 94%, will be reflected back into the low-velocity layer and will not be able to escape except by striking some end surface at an angle smaller than the critical angle of grazing incidence. Thus the said low-velocity layer will carry seismic energy through the whole of its extent. The energy released by the explosion will be detectable only in the vicinity of the edge of the low-velocity layer.

For measuring the seismic waves resulting from the explosion, a plurality of geophones are placed at spaced points on or near the surface of the ground or alternatively in conveniently located boreholes, and the results are recorded, in a manner to be described. Since the energy is released from the low-velocity layer only near its edges, the amplitude of the seismic waves will be greater at points directly above or in the immediate vicinity of the edges of said layer. By recording the true amplitude of ground wave motion it is possible to plot contours indicative of the outline of the low-velocity layer. The contours will show a maximum or "ridge" in each region corresponding to the boundary of the low-velocity layer.

In the usual practice of seismic prospecting, the amplitude of the earth motion is unimportant because only time relationships are relevant to the evaluation of the depths of the reflecting and refracting surfaces. Velocity sensitive dynamic geophones are normally used for this purpose. Their output is fed to amplifiers having an automatic volume control which reduces large intensities to a predetermined level.

In the practice of this invention, velocity geophones may be used as detector means if the amplifiers are equipped with an integrating network that transforms velocity signals into amplitude signals and if the automatic volume control is excluded from the amplifiers. In this manner, true amplitudes of the earth motion may be recorded.

Fig. 6 shows how the present invention can be used to determine the dip, strike and position of the apex of an inclined low-velocity layer, 8–e imbedded in a higher velocity medium 9–e. Assuming again the low-velocity layer to be limited in thickness by two parallel planes, it is clear by what has been said above that a source of energy 7 located in said layer, as by means of a drill hole 17, will radiate in all possible directions within that layer. The only possible regions from which the energy can escape from the layer are within the cone defined earlier and shown at 18 on Fig. 6 and near the edges of the layer. The release of energy at the apex, as shown at 19, is particularly important in tracing the position of said apex and the attitude of the low-velocity layer in accordance with the present invention.

If a plurality of geophones be placed at spaced points on the surface of the ground, the said geophones will pick-up seismic waves with an amplitude depending upon the position of said geophones relatively to the apex. Geophones 20 and 21, being immediately above the apex will produce records exhibiting a larger amplitude than will geophone 22 which is at some distance away. By plotting the intensity obtained by the above means, at a plurality of points and drawing contours through points of equal intensity, the position of the apex can be mapped completely.

Fig. 7 shows a plan view of the projection of a horizontal irregular low-velocity layer on the surface of the ground, at 23. If a shot point is selected in the layer and geophones placed at spaced points along a plurality of lines as shown at 24 and 25 and the amplitudes at the various geophones recorded in accordance with the present invention, the points where the amplitude is maximum can be plotted, and are indicative of the position of the boundaries of the low-velocity layer.

Fig. 8 shows schematically pick-up apparatus of the type which has been described, including velocity-type geophones 26, an amplifier 27 free from automatic-volume-control devices, an integrating circuit 28, and a voltage recorder 29. The integrating circuit is illustrated as comprising a series resistor 30 and a shunt capacitor 31, but it may comprise more complicated circuits. The voltage recorder may take a variety of forms. It may, for example, comprise a cathode ray oscillograph with photographic attachment, or other types of equipment for recording wave forms may be used.

Although some preferred embodiments of the invention have been described, they do not constitute the only means by which this invention can be practised.

It has been explained that one embodiment of the present invention involves recording maximum amplitudes of earth motion, as distinguished from earth velocity, and this embodiment has certain unique advantages. Records of the velocity of ground motion in response to seismic waves can, however, be used for the purposes of the present invention since there exists a definite relationship between the amplitude of the ground motion and the ground velocity. When velocities are recorded instead of amplitudes it is still necessary that the automatic volume control and other limiting devices be eliminated from the amplifiers in order to secure true intensity response.

The descriptions given herein have postulated the presence of a source of seismic energy located within the low-velocity layer. Although this is a preferred way of practising the invention and it has unique advantages, it is not always necessary to resort to it. In some cases the shot point outside the low-velocity layer gives satisfactory results and is more convenient. Such cases may occur when the plane boundaries of the low-velocity layer are not parallel so that the said layer can trap energy originating outside of it. Part of the energy, travelling through a high-velocity layer, will be recorded first. The late arrivals on the records will indicate waves that have travelled some distance through the low-velocity layer and have emerged again by refraction.

Irregular shaped masses of low-velocity may also trap seismic energy by refraction and transmit this energy for some distance. It has been explained how the transmission characteristics depend upon velocity ratios and angles of incidence.

Many applications of the present invention will occur to those skilled in the art. Beds of unconsolidated material, buried in higher velocity zones may be located and their size and shape can be determined. Buried oil sands, to name only one instance, have the properties of low-velocity layers and can be investigated in accordance with the present invention.

While certain preferred embodiments of the invention have been shown and described, many further modifications may be made without departing from the spirit and scope of the present invention. It is therefore intended that the invention be limited only by the terms of the appended claims.

What is claimed is:

1. A method of geological exploration, comprising lowering a source of seismic energy into a subterranean low-velocity medium imbedded in and bounded above and below by at least one higher velocity medium, said low-velocity medium meeting said higher velocity medium at two opposed, generally parallel planes, generating seismic waves within said low-velocity medium of high enough frequency that a major portion of said generated seismic waves will be propagated through said low-velocity medium by total internal reflection, whereby a portion of said propagated waves will be refracted upwardly from the edges of said low-velocity medium, sensing the resulting motion of the ground at each of a plurality of points on the surface of the ground, generating a varying voltage indicative of the instantaneous displacement of the ground at said points, and recording said voltage as a function of time, for said points, whereby points on the ground near the projection of the edge of said low-velocity medium may be identified as having a greater amplitude of displacement than points on the ground remote from said projection.

2. In a method of locating the boundaries of a subterranean low-velocity layer imbedded in and bounded above and below by a medium of higher velocity, the steps of setting up at a first station in said low velocity medium, seismic waves of wave length shorter than the thickness of said layer, to cause said layer to act as a wave guide, and measuring the average propagation velocity of said waves between said station and a plurality of stations on the surface of the ground.

3. A method of geological exploration, comprising lowering a source of seismic energy into a subterranean layer of a low-velocity medium, there being at least one medium of higher velocity lying above and below said low-velocity layer, said low-velocity layer meeting said higher velocity medium above and below at two opposed, generally parallel, generally horizontal planes, causing said source to generate within said low-velocity layer seismic waves substantially all of which have a wave length less than the thickness of said layer, whereby a major portion of said generated seismic waves will be propagated through said low-velocity layer by total internal reflection until they reach an edge thereof remote from said source, where some of them will be refracted upwardly toward the surface of the earth, sensing and measuring the true amplitude of the resulting instantaneous displacement of the surface of the earth at each of a plurality of points along a line on the surface of the earth crossing above said edge of said low-velocity medium, and recording said instantaneous displacement as a function of time for said points, whereby points on the ground near the projection of the edge of said low-velocity medium on the surface of the earth may be identified as having a greater amplitude of displacement than points on the ground remote from said projection.

4. A method of locating the boundaries of a stratum of a subterranean low-velocity medium imbedded in and bounded above and below by a higher-velocity medium, comprising energizing said stratum with seismic waves at a point in said stratum, varying the frequency of said waves into and out of a range in which said stratum acts as a wave guide, and measuring at another point the velocity of propagation of said waves from said first point to said second point as a function of frequency, whereby the abrupt appearance of low propagation velocities when the frequency is increased beyond a critical value indicates that a low-velocity medium extends through a considerable portion of the path between said points and is acting as a wave guide.

5. A method of locating the boundaries of a stratum of a subterranean low-velocity medium imbedded in and bounded above and below by a higher-velocity medium, comprising lowering a source of seismic energy into said stratum of low-velocity medium, directing seismic waves from said source into said layer, varying the frequency of said waves into a range high enough so that the wave length of said seismic waves is less than the thickness of said layer, so as to cause said low-velocity medium to act as a wave guide, and below said range of frequencies, so as to cause said low-velocity medium not to act as a wave guide, and repeatedly measuring at a point remote from said first point the velocity of propagation of said waves between said points as a function of frequency, whereby the abrupt appearance of low propagation velocities when the frequency is increased beyond a critical value indicates that the low-velocity medium extends through a considerable portion of the path between said points and is acting as a wave guide.

References Cited in the file of this patent
UNITED STATES PATENTS

| | | |
|---|---|---|
| 2,390,187 | Sharpe | Dec. 4, 1945 |
| 2,420,672 | Maillet | May 20, 1947 |
| 2,477,844 | Wolf | Aug. 2, 1949 |
| 2,503,904 | Dahm | Apr. 11, 1950 |
| 2,569,411 | Ellis | Sept. 25, 1951 |